(12) United States Patent
Kretsch

(10) Patent No.: US 7,000,372 B2
(45) Date of Patent: Feb. 21, 2006

(54) METHOD AND SYSTEM TO CONTROL WEEDS

(75) Inventor: Kevin R. Kretsch, Plymouth, MN (US)

(73) Assignee: Lake Restoration, Inc., Rogers, MN (US)

( * ) Notice: Subject to any disclaimer, the term of this patent is extended or adjusted under 35 U.S.C. 154(b) by 0 days.

(21) Appl. No.: 10/054,747

(22) Filed: Jan. 22, 2002

(65) Prior Publication Data

US 2003/0136096 A1    Jul. 24, 2003

(51) Int. Cl.
*A01D 44/00* (2006.01)
(52) U.S. Cl. .......................................................... 56/8
(58) Field of Classification Search ....................... 56/8, 56/9; 210/169
See application file for complete search history.

(56) References Cited

U.S. PATENT DOCUMENTS

| | | | | |
|---|---|---|---|---|
| 1,182,961 A | * | 5/1916 | Beardall | 172/24 |
| 2,122,692 A | * | 7/1938 | Lubins | 56/8 |
| 2,919,027 A | * | 12/1959 | Blumenfeld | 210/169 |
| 2,975,791 A | * | 3/1961 | Pansini | 134/167 R |
| 3,032,044 A | * | 5/1962 | Pansini | 134/111 |
| 3,860,518 A | * | 1/1975 | Henricksen | 210/776 |
| 3,883,366 A | * | 5/1975 | Blumenfeld | 134/52 |
| 3,922,991 A | * | 12/1975 | Woods | 114/222 |
| 4,127,693 A | | 11/1978 | Lemelson | 428/163 |
| 4,137,693 A | * | 2/1979 | Thompson et al. | 56/8 |
| 4,696,149 A | | 9/1987 | Hawk | 56/8 |
| 4,852,337 A | | 8/1989 | Peterson | 56/8 |
| 4,999,982 A | | 3/1991 | Kriger | 56/8 |
| 5,079,905 A | | 1/1992 | Bergstrom | 56/8 |
| 5,146,997 A | | 9/1992 | Korin | 172/42 |
| 5,167,805 A | * | 12/1992 | Theiss | 210/169 |
| 5,201,168 A | | 4/1993 | Jenson | 56/8 |
| 5,277,801 A | * | 1/1994 | Lundquist | 210/169 |
| 5,305,585 A | | 4/1994 | Cousineau | 56/8 |
| 5,359,835 A | | 11/1994 | Majkrzak | 56/8 |
| 5,430,998 A | * | 7/1995 | Albrecht | 56/8 |
| 5,493,850 A | | 2/1996 | Torkelson | 56/8 |
| 6,374,519 B1 | * | 4/2002 | Beaumont | 37/307 |

FOREIGN PATENT DOCUMENTS

| | | |
|---|---|---|
| DE | 477077 | 5/1929 |
| FR | 622623 | 6/1927 |

OTHER PUBLICATIONS

"Be Weed Free in 2003—Using Your Colman Beach-Groomer System", http://colmanenterprises.com/using/content.html, Product information published by Colman Beach-Groomer System Inc. Detroit Lakes, MN, (Apr. 1, 2003), 4 pgs.

* cited by examiner

*Primary Examiner*—Thomas B. Will
*Assistant Examiner*—Alicia Torres
(74) *Attorney, Agent, or Firm*—Schwegman, Lundberg, Woessner & Kluth P.A.

(57) ABSTRACT

A weed control system for a body of water which includes a weed contacting member suspendable within the body of water proximate a bed of weeds and a drive member for automatically moving the weed contacting member repeatedly over the bed of weeds such that the weed contacting member repeatedly brushes against any weeds in the bed of weeds.

26 Claims, 3 Drawing Sheets

METHOD AND SYSTEM TO CONTROL WEEDS

FIELD OF THE INVENTION

This invention relates to the field of weed control, and more specifically to a method and apparatus for removing and controlling weeds in a body of water.

BACKGROUND

Weeds and plants grow in and along the shores of most lakes and ponds. Many owners of homes and cabins along shorelines enjoy using the shallow portions of the lakes for swimming, boat launching, and other water activities. The weeds are a nuisance and interfere with such activities.

Removing the weeds manually using rakes or other tools is a labor intensive, boring task. Moreover, the weeds are then piled up on shore or floating in the water, and must be removed. Bulky, mechanical weed harvesters are not practical for private, individual use, while chemical treatments are unsatisfactory from an environmental perspective. Moreover, any weed removal process must typically be repeated shortly thereafter, since weeds grow so fast.

SUMMARY

Accordingly, there is a need for a simple, safe, and easy to use weed control system. One embodiment of the present invention provides a system for automatically controlling weed growth in a body of water. In one embodiment, a weed control system includes a weed contacting member suspendable within the body of water proximate a bed of weeds and a drive member for automatically moving the weed contacting member repeatedly over the bed of weeds such that the weed contacting member repeatedly brushes against any weeds in the bed of weeds.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
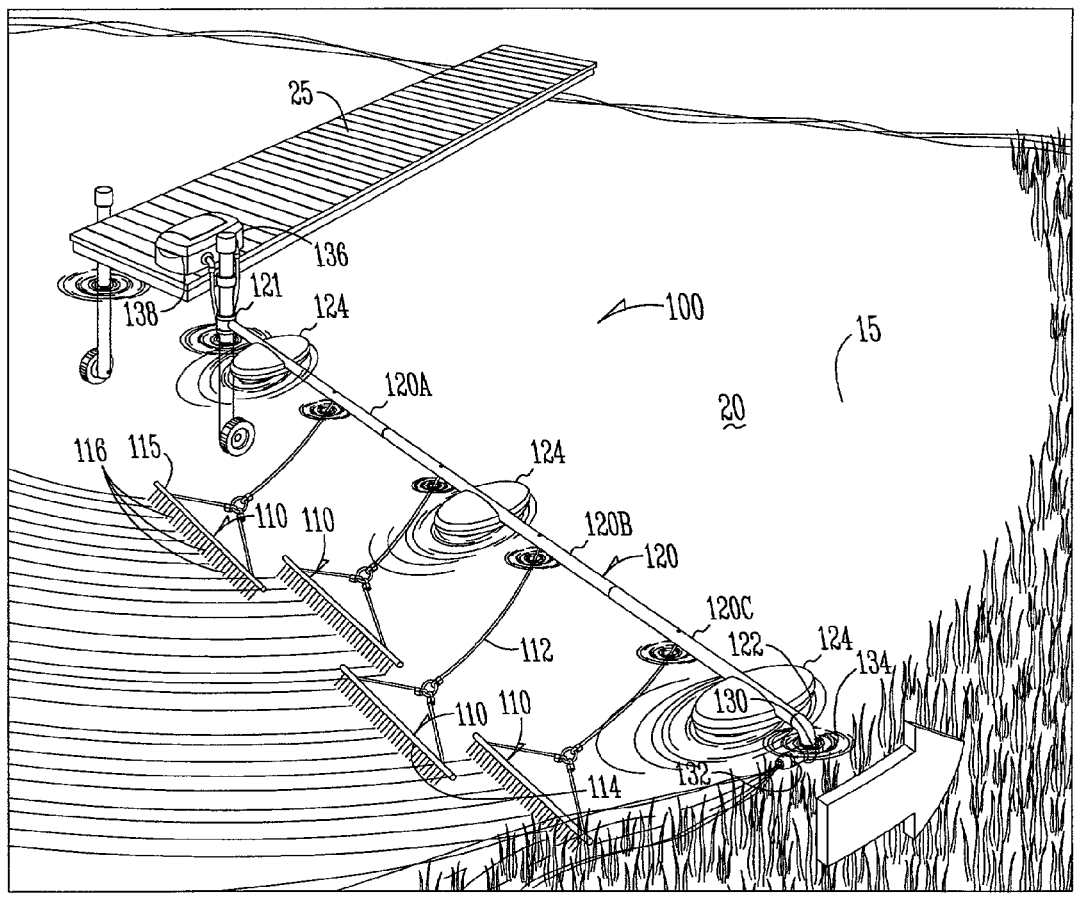
FIG. 1 shows a perspective view of a weed control system according to one embodiment.

FIG. 1 shows a perspective view of a weed control system 100 according to one embodiment. In general, weed control system 100 includes one or more weed contacting members 110 which are positioned proximate a weed bed located in a body of water 15. System 100 controls weeds in the body of water by repeatedly brushing weed contacting member 110 over the weed bed. The weed contacting member brushes against, or lightly and momentarily contacts, the weeds, in passing by the weeds. This can be repeatedly done until the weeds disintegrate. Since lake weeds are comprised of a high percentage of water, the constant brushing action gradually tears at and eliminates the weeds. There are very few weed fragments that end up on shore using the present technique.

In one embodiment, weed control system 100 includes weed contacting member 110, a support member 120, and a drive member 130 coupled to the support member for moving weed contacting member 110 in a repeating pattern over the weed bed.

Each weed contacting member 110 includes a rake-like structure suspended from support member 120. In one embodiment, weed contacting member includes a connection portion 112 and a contact portion 114. Connection portion 112 is attached to support member 120. Connection portion 112 is a flexible member allowing contact portion 114 to flexibly hang in the water suspended beneath support member 120. The length of connection portion 112 can be varied to allow the height of contact portion 114 to be raised and lowered as needed. For example, raising the contact portion allows the weed contacting member to more efficiently get closer to the dock during use of the system, while lowering the contact portion 114 allows the deep area of the weed bed to be cleared.

Contact portion 114 includes a cross-bar 115 and a plurality of tines 116 extending from the cross-bar. In one example, cross-bar 115 is a rigid elongated member with tines 116 extending therefrom. Weed contacting member 110 is heavy enough such that it hangs down into the water, suspended from support member 120. As weed contacting member 110 is pulled back and forth through the weed bed, the weight of the contacting member keeps it down in the water such that it can contact the weeds. In one embodiment, tines 116 are light-weight, slender prongs which are adapted to repeatedly move over the weed bed to repeatedly brush against and disintegrate any weeds therein. Tines 116 can be made of plastic, stainless steel, or other material.

In the present example, four weed contacting members 110 are shown for system 100. In other embodiments, one, two, three, or more than four members can be employed depending on size and density of the weed bed.

Moreover, the contacting members 110 can be utilized in various configurations. For instance, if the system is installed in summer after weeds are growing, one or more of contacting members 110 can be easily detached from support member 120. This enables some contacting members to be removed if weed density requires greater thrust than drive member 130 can deliver. Thus, in one example, one third of the contacting members can be used during the first week of operation. These contacting members can then be moved to another third of support member 120 for the second week (or additional contacting members can be added to the second third of the support member). The same can be repeated for the third week. At some point all contact members can be used when the thrust of drive member 130 exceeds the drag of contact members 110 through the weeds. In another example, when the system is installed in spring before weeds are growing or dense, all of the contact members 110 can be installed and the system can be run at intervals to keep the lake weeds from growing.

In one embodiment, support member 120 is an elongated member located approximately on or above a surface 20 of the body of water and extending parallelly over the surface. In one embodiment, support member 120 has a first end 121 rotatably coupled to a stationary unit, such as a dock 25, proximate the body of water. In other examples, support member 120 can be rotatably coupled to a stationary pole, a buoy, an anchor, or other object. In one embodiment, a stationary unit such as a track coupled to dock is used, and the first end 121 of support member 120 runs back and forth along the track driving the support member back and forth in a linear manner.

Support member 120 extends to a second end 122. One or more buoyant members 124 can be used to uphold support member 120 at or above the surface of the body of water. In other examples, support member 120 can be formed of a buoyant material, or a buoyant material can be integrated into the support member to help keep it proximate the surface of the water.

In one embodiment, support member 120 includes a series of sub-sections 120A, 120B, 120C, and so on. This allows support member 120 to be sized as needed by the user. If a small area of weeds needs to be cleared, then only one or two sections 120A and 120B need to be used. A larger area can require additional sections. In one example, each subsection 120A–120C is approximately 6–8 feet in length. This makes the present device easy to install, uninstall, modify, and easy to move to a different location as needed. As will be discussed below, not much force is needed to drive the floating support member 120 over the water. Accordingly, the support member can be extended a great distance over the water. In some examples, support member 120 is formed from polythene members, polycarbonate, or PVC pipe.

Support member 120 is driven by drive member 130. In this example, drive member 130 is attached to second end 122 of support member 120. Drive member 130 can also be attached almost anywhere along the support member. In some examples, two or more drive members 130 are provided to increase the power of the system. Again, since drive member 130 drives weed contacting member 110 using an above-water support member 120, not much power is required, making it safe to leave unattended.

In one embodiment, drive member 130 includes a water-activated driver having a first nozzle 132 and a second nozzle 134 which are each operatively connected to a water pump 136 located in a control box 138. One or more hoses can run along the outside or inside of support member 120 to nozzles 132 and 134. In one example, a tube is internally integrated into support member 130 to deliver water to the nozzles. Also, in one embodiment pump 136 can be located near second end 122.

Nozzles 132 and 134 open in generally opposite directions from each other. In one embodiment, first nozzle 132 and second nozzle 134 are alternately activated so as to reversibly drive support member 120 back and forth across a section of the body of water such that weed contacting member 110 is repeatedly pulled back and forth across the section by the support member.

In one embodiment, drive member 130 is an automatically reversible drive which automatically changes a direction of movement of weed contacting member 110 when a pre-determined time limit is reached. This allows the unit to go back and forth repeatedly over a weed bed. The unit reverses when the time limit is reached and moves in the other direction. Thus it goes back and forth in different directions as a function of time, not distance covered by the unit. In one example, the direction can be reversed using a contact switch, position sensor, or proximity sensor which can be configured to sense the position of support member 120 and reverse the direction of the unit when a given distance or position of the support member has been reached.

In this example, support member 120 is rotatably coupled to dock 25. Accordingly, driver 130 causes support member 120 to swivel back and forth defining a circular arc across the surface of a section of the body of water. In one example, the support member can be attached to a post and rotated completely in a circle around the post in one direction. Other types of repeating patterns of motion are within the scope of the present system.

In one embodiment, pump 136 is a self-priming pump located in a control box 138. In one example, a 15 amp, one horsepower pump is used. Such a pump develops approximately 7 lbs. of thrust at each nozzle 132 and 134. This low power thrust is safe. Moreover, if the weed contacting member gets stuck or hung up, the reversing timer discussed above allows it to automatically get unstuck.

Figure 2:
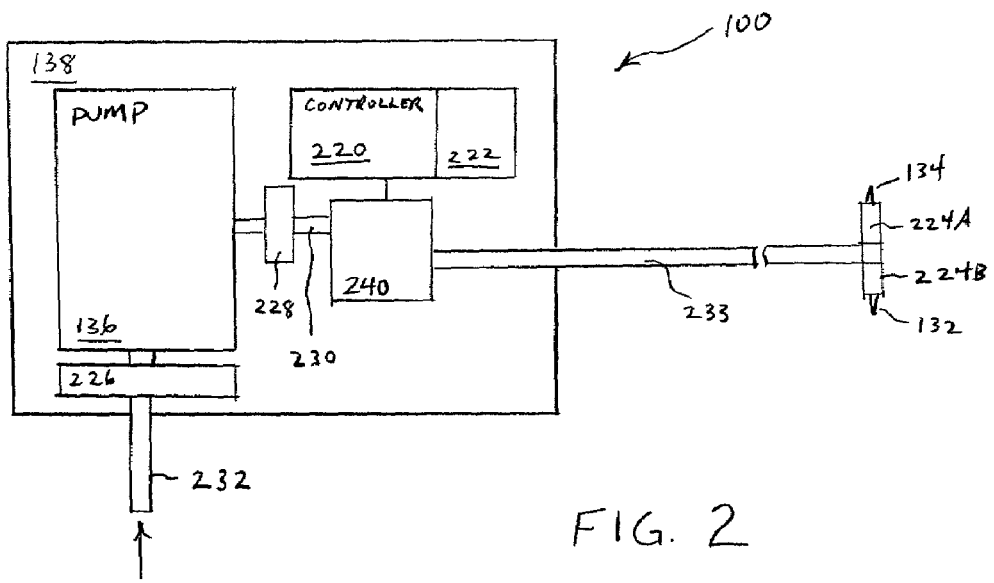
FIG. 2 shows a schematic representation of portions of the weed control system of FIG. 1 according to one embodiment.

FIG. 2 shows a schematic representation of a controller portion of weed control system 100. A controller 220 controls the flow of water through the system by controlling valves 224A, 224B, and valve 240. Valves 224A and 224B are electrically connected to controller 220, and in response to a signal from the controller, valves 224A and 224B open and close to allow water to flow through either nozzle 134 or 132, respectively. In one embodiment, valves 224A and 224B are lawn irrigation type valves, which perform well in water.

In this example, valves 224A and 224B are located proximate the distal end of the system, near the nozzles, and are coupled to a hose 233 coming from pump 136. In another example, valves 224A and 224B can be located inside control box 138 and two hoses can run to nozzles 132 and 134. In one example, a timer 222 is used by controller 220 to control the water flow through the system. For example, controller 220, in response to timer 222, opens and closes valves 224A and 224B to periodically alternate the water flow between the two nozzles 132 and 134. When controller 220 allows the water flow through the nozzles to alternate, the direction of the drive member reverses, such that the weed contacting member is repeatedly pulled back and forth across the bed of weeds.

In one embodiment, valve 240 is a ball valve which is electrically controlled by controller 220 or manually controlled by a user. Valve 240 can be adjusted to control the flow out of nozzles 132 and 134. By adjusting valve 240 a user is able to increase/decrease speed and thrust. Thus, if weeds are not very dense, a low thrust can be used, and vice versa. In one embodiment, valve 240 can vary the thrust between approximately 1 lb. and approximately 7 lbs. In some embodiments, valve 240 is omitted.

Also shown in FIG. 2 is an inflow filter 226 coupled between an input hose 232 and pump 136, and a strainer 228 at the output of pump 136 to further strain debris out of water. Thus, in use, water flows into input hose 232, through inflow filter 226, through pump 136, through strainer 228, a hose 230, ball valve 240, hose 233, and out to valves 224A and 224B which can be controlled by controller 220. In one example, a foot valve is located at the end of hose 232 to keep the pump primed when it is shut off.

Referring to both FIGS. 1 and 2, in one example use of system 100, a user couples first end 121 of support member 120 to a stationary unit 25 proximate the body of water such that the support member extends over a surface of the body of water. Pump 136 and controller 220 are activated, and drive member 130 begins rotating the support member back and forth such that weed contacting member 110 brushes against any weeds located proximate the weed contacting member. In one example use of the present system, the system went through approximately 700 repeating cycles per day, and the weed area bed was cleared within a week. In other example uses, depending on density of weeds, the unit can be used for a few cycles per day to approximately 1400 cycles per day.

The controls of the present system can be programmed to vary how the system operates. For instance, the controls can be made to nestle support member 120 against the dock at the end of an operating cycle. In one example, the unit can be set to run every other day for 4 hours. At the end of the 4 hours the unit will complete a cycle that nestles it against the dock. Other operating cycles are within the scope of the present system.

Figure 3:
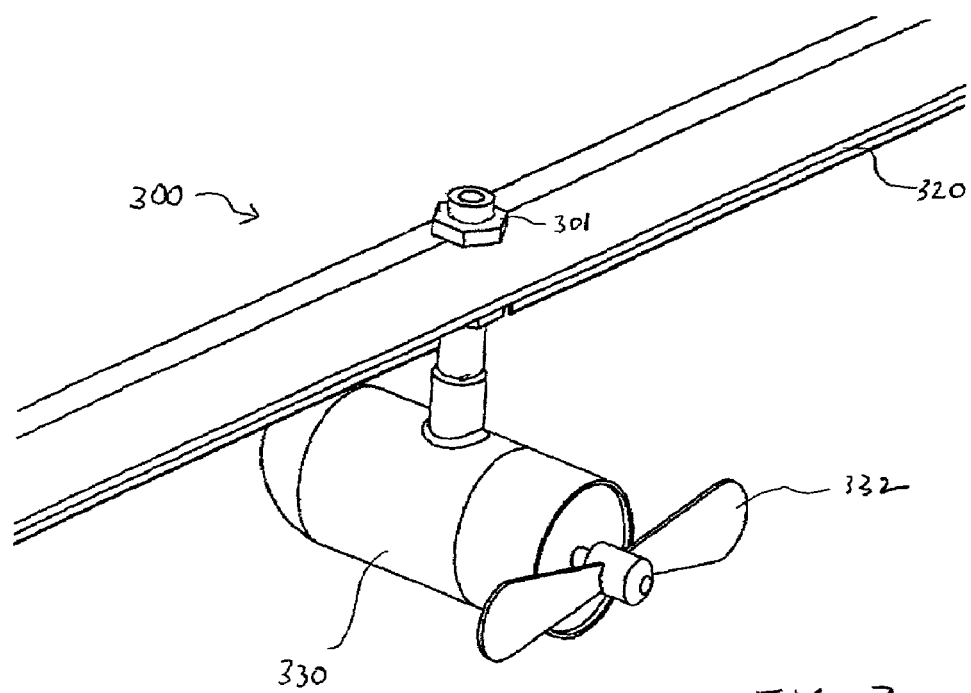
FIG. 3 shows a portion of a drive member for a weed control system according to one embodiment.

FIG. 3 shows a portion of a drive member 330 for a weed control system 300 according to one embodiment. Weed control system 300 is similar in some respects to weed control system 100 discussed above and certain aspects will be omitted for sake of brevity. In this example, a support member 320 is extended over or on the surface of a body of water. As discussed above for support member 120, support member 320 can have one end rotatably connected to a stationary unit such as a dock and can be supported by one or more buoyant members. In this example, support member 320 is driven by a motor-activated drive member such as a trolling motor 330. Trolling motor 330 is attached to support member 320 by a nylon nut 301 and includes a reversible propeller 332 which is electrically connected to a controller (not shown) such as controller 220 (FIG. 2). The controller can reverse the rotation of propeller 332 as a function of time, or by the use of proximity sensors, as discussed above. One or more weed contacting members (not shown) can be suspended from support member 320. Other details and use of system 300 are incorporated by reference from the discussion above of system 100 in FIGS. 1 and 2.

Figure 4:
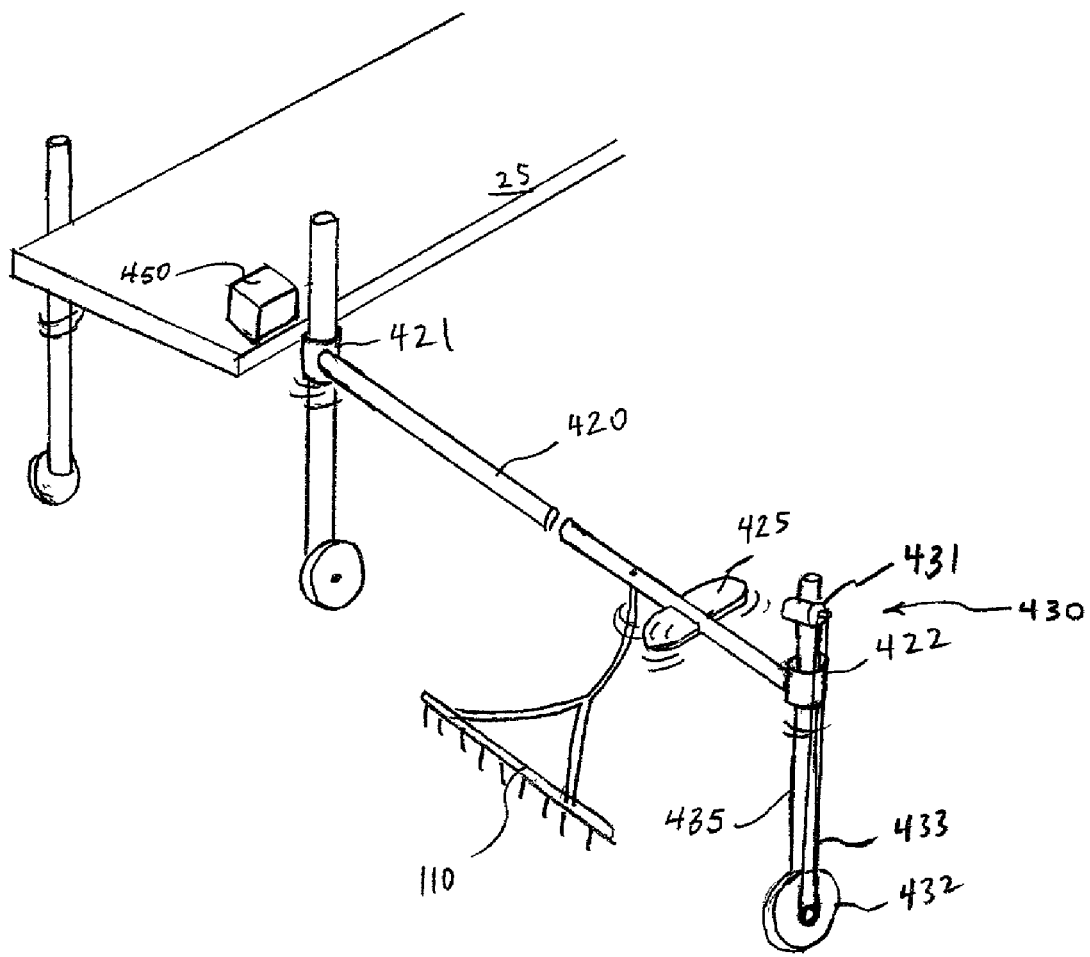
FIG. 4 shows a perspective view of a weed control system according to one embodiment.

FIG. 4 shows a perspective view of a weed control system 400 according to one embodiment. Weed control system 400 is similar in some respects to weed control system 100 discussed above and certain aspects will be omitted for sake of brevity. In this example, weed control system 400 includes weed contacting member 110, a support member 420, and a drive member 430 coupled to the support member for moving weed contacting member 110 in a repeating pattern over the weed bed.

Support member 420 includes a first end 421 rotatably coupled to dock 25 and can be supported by one or more buoyant members 425. A second end 422 of the support member encloses a vertically oriented shaft 435. A motor 431 is coupled to shaft 435 and operatively connected to a wheel 432 which rests on the floor of the body of water. As motor 431 is activated it drives wheel 432 via a chain or drive belt 433. This causes support member 420 to move in an arc pattern over the surface of the water. Again, a controller 450 can be used to reverse the rotation of motor 431 as a function of time, or by the use of proximity sensors, as discussed above. Vertical shaft 435 is allowed to ride up and down within second end 422 of support member 420. This allows the shaft to translate up and down within end 422 as the support bar moves between shallow and deep portions of the body of water.

CONCLUSION

The present system involves a technique of controlling weeds in a body of water by repeatedly brushing a bed of weeds with a light-weight weed contacting member which is suspended from a support member located proximate a surface of the body of water. In one example, the system automatically clears out the weeds without human intervention since the system is adapted to control a direction of the weed contacting member in response to a timer such that the weed contacting member moves in a repeating pattern over the bed of weeds. For example, the controller can make the weed contacting member move in a repeating back and forth pattern over the weed bed. As the weed contacting member is driven back and forth, it acts to cumulatively disintegrate the weeds in its paths. This allows a user to start the apparatus in motion and when the apparatus is finished, the weeds are gone and the user can turn it off. It is easy to set up and remove the apparatus, allowing it to be used whenever necessary. Moreover, by driving a light-weight weed contacting member 110 using an above-water support member 120, not much power is required, making it safe to leave unattended.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A weed control system for a body of water, the system comprising:
    a weed contacting member suspendable within the body of water proximate a bed of weeds; and
    a drive member for moving the weed contacting member in a repeating, circular arc pattern over the bed of weeds, the weed contacting member freely hanging down from a support member located at a surface of the body of water such that the weed contacting member repeatedly brushes against any weeds in the bed of weeds, wherein the weed contacting member includes an elongate member extending in a parallel direction relative to a length of the support member, wherein the drive member is reversible and is configured to change a direction of movement of the weed contacting member when a pre-determined time limit is reached.

2. A weed control system for a body of water, the system comprising:
    a weed contacting member suspendable within the body of water proximate a bed of weeds; and
    a drive member for moving the weed contacting member in a repeating, circular arc pattern over the bed of weeds, the weed contacting member freely hanging down from a support member located at a surface of the body of water such that the weed contacting member repeatedly brushes against any weeds in the bed of weeds, wherein the weed contacting member includes an elongate member extending in a parallel direction relative to a length of the support member, wherein the drive member includes a pair of opposing nozzles which alternately eject a jet of water to drive the drive member.

3. The weed control system of claim 2, wherein the support member is at least six feet long and the weed contacting member is disposed along at least a portion of the length of the support member.

4. A weed control system for a body of water, the system comprising:
   a weed contacting member suspendable within the body of water proximate a bed of weeds; and
   a drive member for moving the weed contacting member in a repeating, circular arc pattern over the bed of weeds, the weed contacting member freely hanging down from a support member located at a surface of the body of water such that the weed contacting member repeatedly brushes against any weeds in the bed of weeds, wherein the weed contacting member includes an elongate member extending in a parallel direction relative to a length of the support member, wherein the weed contacting member includes a plurality of tines disposed along a length of the elongate member and running in a perpendicular direction relative to a motion of the weed contacting member.

5. A weed control system for a body of water, the system comprising:
   a weed contacting member including an elongate member suspended from a support member and extending along the support member in a parallel direction relative to a length of the support member; and
   water activated means including a nozzle which emits water to develop thrust for moving the support member and the weed contacting member in a repeating pattern through the body of water such that the weed contacting member repeatedly contacts any weeds in a path of the weed contacting member.

6. The weed control system of claim 5, wherein the water activated means moves the weed contacting member in a repeating, circular arc pattern.

7. The weed control system of claim 5, wherein the weed contacting member is flexibly attached to the support member which is located approximately on or above a surface of the body of water.

8. The weed control system of claim 5, wherein the weed contacting member includes a cross-bar having a plurality of tines extending from a body of the cross-bar.

9. A weed control system for a body of water, the system comprising:
   a weed contacting member including an elongate member suspended from a support member and extending in a parallel direction relative to a length of the support member; and
   water activated means including a nozzle which emits water to develop thrust for moving the weed contacting member in a repeating pattern through the body of water such that the weed contacting member repeatedly contacts any weeds in a path of the weed contacting member;
   wherein water activated means further comprises a second nozzle and a water pump coupled to the nozzle and the second nozzle which open in generally opposite directions from each other and which are alternately activated.

10. The weed control system of claim 9, wherein the weed contacting member is suspended from the support member which is rotatably coupled to a stationary unit proximate the body of water and which extends over a surface of the body of water.

11. The weed control system of claim 9, wherein water activated means automatically changes a direction of movement of the weed contacting member when a pre-determined time limit is reached.

12. A weed control system for a body of water, the system comprising:
   a support member;
   a buoyant member coupled to the support member to keep the support member at or above a surface of the body of water;
   an elongate weed contacting member suspended from the support member to descend beneath the surface of the body of water and extending parallel relative to a length of the support member; and
   a driver to move the support member across the surface of the body of water in a repeating pattern such that the weed contacting member also moves in a repeating pattern and repeatedly brushes against any weeds beneath the support member.

13. The weed control system of claim 12, wherein the support member includes an elongated pipe having a first end rotatably coupled to a stationary unit proximate the body of water.

14. The weed control system of claim 12, wherein the driver includes a water activated driver coupled to the support member.

15. A weed control system for a body of water, the system comprising:
   a support member;
   a buoyant member coupled to the support member to keep the support member at or above a surface of the body of water;
   a weed contacting member suspended from the support member to descend beneath the surface of the body of water; and
   a driver to move the support member across the surface of the body of water in a repeating pattern such that the weed contacting member also moves in a repeating pattern and repeatedly brushes against any weeds beneath the support member, wherein the driver includes a reversible propeller.

16. A weed control system for a body of water, the system comprising:
   a support member;
   a buoyant member coupled to the support member to keep the support member at or above a surface of the body of water;
   a weed contacting member suspended from the support member to descend beneath the surface of the body of water; and
   a driver to move the support member across the surface of the body of water in a repeating pattern such that the weed contacting member also moves in a repeating pattern and repeatedly brushes against any weeds beneath the support member, wherein the driver includes a motor-driven wheel which rolls over a floor of the body of water.

17. A weed control system for a body of water, the system comprising:
   a weed contacting member;
   means for moving the weed contacting member through the body of water proximate a bed of weeds; and
   a controller which, in response to a timer, periodically reverses the direction of the means for moving such that the weed contacting member is repeatedly moved back and forth across the bed of weeds and such that if the weed contacting member gets stuck within the water, the controller will reverse the direction of the means for moving and the weed contacting member will become free once the timer reaches a time limit.

18. The weed control system of claim 17, wherein the weed contacting member is suspended from a support member such that the weed contacting member brushes against any weeds in the bed of weeds.

19. The weed control system of claim 17, wherein the means for moving the weed contacting member includes a water activated means.

20. The weed control system of claim 17, wherein the means for moving the weed contacting member includes a motor-driven means.

21. A weed control system for a body of water, the system comprising:
   an elongated support member positioned parallel to a surface of a body of water and positionable at or above the surface, the elongated support member having a first end rotatably coupled to a stationery unit proximate the body of water;
   an elongate weed contacting member suspended from the support member and located beneath the surface, the elongate weed contacting member extending parallel relative to a length of the support member; and
   a reversible driver coupled proximate a second end of the elongated support member to drive the elongated support member in a rotating manner repeatedly back and forth across the surface of a section of the body of water such that the weed contacting member is repeatedly pulled back and forth beneath the surface of the section to repeatedly contact any weeds located in that section, wherein the reversible driver is water activated.

22. The weed control system of claim 21, wherein the reversible driver includes a pair of nozzles.

23. The weed control system of claim 21, wherein the weed contacting member includes a cross-bar having a plurality of tines extending from a body of the cross-bar.

24. A weed control system for a body of water, the system comprising:
   an elongated support member positioned parallel to a surface of a body of water and positionable at or above the surface, the elongated support member having a first end rotatably coupled to a stationery unit proximate the body of water;
   an elongate weed contacting member suspended from the support member and located beneath the surface, the elongate weed contacting member extending parallel relative to a length of the support member; and
   a reversible driver coupled proximate a second end of the elongated support member to drive the elongated support member in a rotating manner repeatedly back and forth across the surface of a section of the body of water such that the weed contacting member is repeatedly pulled back and forth beneath the surface of the section to repeatedly contact any weeds located in that section, wherein the reversible driver is motor driven.

25. A weed control system for a body of water, the system comprising:
   a weed contacting member suspendable within the body of water proximate a bed of weeds; and
   a drive member for automatically moving the weed contacting member in a repeating, circular arc pattern over the bed of weeds, the weed contacting member freely hanging down from a support member located at a surface of the body of water such that the weed contacting member repeatedly brushes against any weeds in the bed of weeds, wherein the drive member includes a reversible propeller.

26. A weed control system for a body of water, the system comprising:
   a weed contacting member suspendable within the body of water proximate a bed of weeds; and
   a drive member for automatically moving the weed contacting member in a repeating, circular arc pattern over the bed of weeds, the weed contacting member freely hanging down from a support member located at a surface of the body of water such that the weed contacting member repeatedly brushes against any weeds in the bed of weeds, wherein the drive member includes a motor-driven wheel which rolls over a floor of the body of water.

* * * * *